US008285865B2

(12) United States Patent
Gruyer et al.

(10) Patent No.: US 8,285,865 B2
(45) Date of Patent: Oct. 9, 2012

(54) METHOD FOR TRANSMITTING ACARS MESSAGES OVER IP

(75) Inventors: Pierre Gruyer, Labarthe sur Leze (FR); Frederic Durand, Colomiers (FR); Pascal Chaumette, Blagnac (FR); Yves Rutschle, Saint Orens (FR)

(73) Assignee: Airbus Operations, Toulouse (FR)

( * ) Notice: Subject to any disclaimer, the term of this patent is extended or adjusted under 35 U.S.C. 154(b) by 59 days.

(21) Appl. No.: 12/674,815

(22) PCT Filed: Sep. 2, 2008

(86) PCT No.: PCT/EP2008/061556
§ 371 (c)(1),
(2), (4) Date: Jul. 28, 2010

(87) PCT Pub. No.: WO2009/030681
PCT Pub. Date: Mar. 12, 2009

(65) Prior Publication Data
US 2011/0047281 A1    Feb. 24, 2011

(30) Foreign Application Priority Data
Sep. 3, 2007    (FR) ...................................... 07 57311

(51) Int. Cl.
*G06F 15/16*    (2006.01)
(52) U.S. Cl. ........................................ 709/230; 709/228

(58) Field of Classification Search .................. 709/228, 709/230
See application file for complete search history.

(56) References Cited

U.S. PATENT DOCUMENTS
6,785,301 B1 *   8/2004   Chapman et al. ............. 370/522
2001/0055312 A1 * 12/2001   Negus ........................... 370/445

FOREIGN PATENT DOCUMENTS
GB         2 433 006 A       6/2007
WO    WO 2006/026632 A1      3/2006

OTHER PUBLICATIONS

Stefan Mangold, et al., "Analysis of IEEE 802.11E for QoS Support in Wireless LANs", IEEE Wireless Communications, XP011107079, Dec. 2003, pp. 40-50.

* cited by examiner

*Primary Examiner* — Adnan Mirza
(74) *Attorney, Agent, or Firm* — Oblon, Spivak, McClelland, Maier & Neustadt, L.L.P.

(57) ABSTRACT

A method for transmitting ACARS messages over IP, between a transmitter and a receiver, includes dividing an ACARS message of a first application into a plurality of blocks. For each block of the message, except for the last, a dummy acknowledgment of receipt of the block is locally sent back at the transmitter to the application. When the transmitter receives from the receiver a message indicating proper reception of the plurality of transmitted blocks, the method further includes generating an acknowledgment of receipt of the last block before sending the acknowledgement of receipt back to the application.

Figure 1:
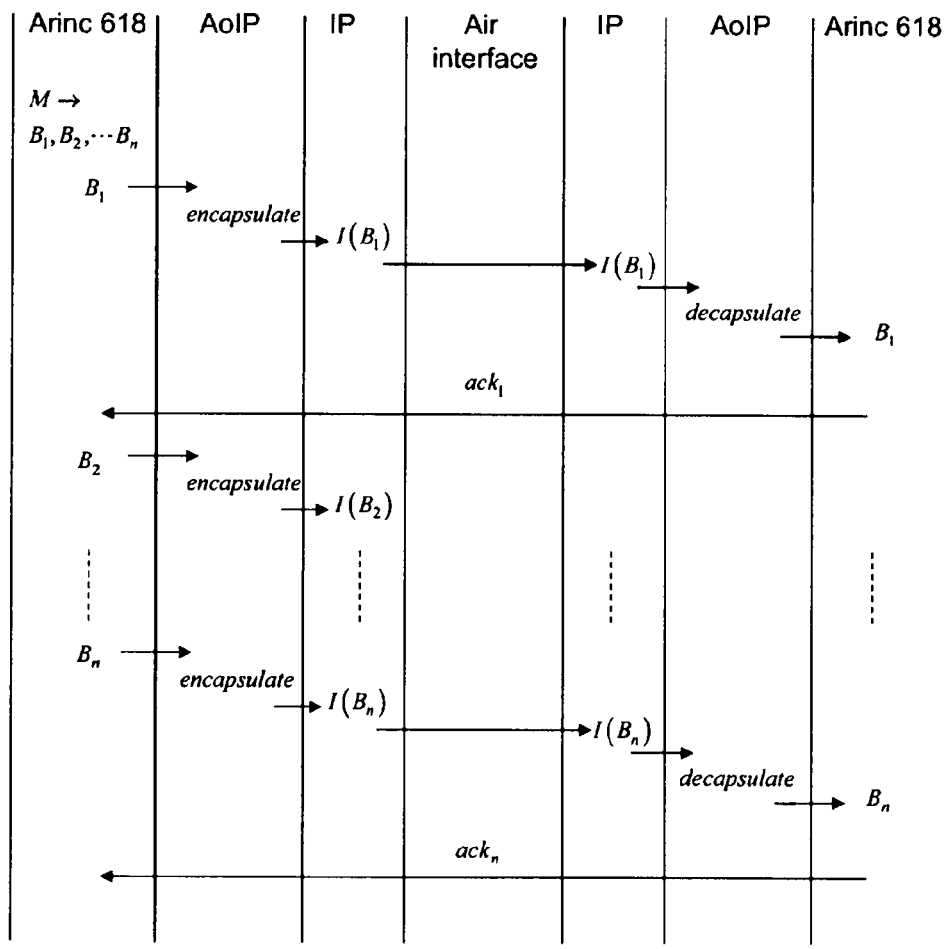

10 Claims, 6 Drawing Sheets

METHOD FOR TRANSMITTING ACARS MESSAGES OVER IP

TECHNICAL FIELD

The present invention generally relates to the field of aeronautical telecommunications and more particularly to that of transmitting ACARS (Aircraft Communication and Reporting System) messages.

STATE OF THE PRIOR ART

In the aeronautical field, with the ACARS system, data may be transmitted between an aircraft and an earth-borne station, notably with exchange of information of the AOC (Aeronautical Operational Control) type with airline operators or information of the ATC (Air Traffic Control) type with air controllers. The data link between onboard and the ground is generally designated by the generic term of <<datalink>>.

The ACARS system may use several transmission media (also called media in the state of the art), or more exactly several subnetwork types for transmitting data, i.e. HF, VHF or SATCOM subnetworks. The telecommunications VHF subnetwork allows point-to-point links in direct line of site with transmitters/receivers on the ground but with a relatively reduced range. The satellite telecommunications subnetwork on the other hand provides worldwide coverage, except for the polar regions, but with high communications costs. The HF subnetwork as for it, provides coverage of the polar regions.

Generally, transmission of data to the ground is accomplished by means of an on-board telecommunications module or CMU (Communications Management Unit) which automatically selects the most suitable transmission medium (VHF, HF, SATCOM) according to a certain number of parameters.

The aforementioned communications media however begin to reach their limits in terms of access availability, even though communications with the ground require increasingly high throughputs. Further, communications costs caused by increasingly large volumes of data to be transmitted are a burden on airline budgets.

To find a remedy to this situation, certain actors in the aeronautical field have proposed the use of general public transmission media for transmitting ACARS messages. Thus, when the aircraft is parked at the boarding gate, is on the ground or in an approach phase, it may establish a connection with the air control centre or the operational centre of the airline, via a GPRS network, a Wi-Fi terminal or a Wi-Max station. Transmission of the ACARS messages is then accomplished by encapsulating them in IP datagrams as described for examples in international application WO2006/026632. This is then designated by ACARS over IP or over AoIP.

ACARS message exchange between an aircraft and the operational centre of the airline should be compliant with the ARINC 618 standard, regardless of whether these messages are encapsulated in IP datagrams or not. The ARINC 618 protocol imposes segmentation of the ACARS messages into elementary blocks of 220 useful characters and no transmission of a new block until it has received acknowledgment of the previous block. This <<stop and wait>> acknowledgment mechanism has the merit of providing great robustness but poorly lends itself to IP transmission, as this will be seen hereafter.

FIG. 1 schematically illustrates ACARS message transmission over IP between a transmitter (for example an aircraft) and a receiver (for example the base of an airline).

In the figure, the Arinc 618 application layers, the adaptation layers denoted AoIP for adaptation to the IP layer, the IP layers are illustrated both on the transmitter side and on the receiver side. The air interface between the aircraft and the ground station relaying the messages towards the centre of the airline is also illustrated.

The ACARS message M is at most segmented in n blocks $B_1, B_2, \ldots, B_n$, with $n \leq 16$, each block containing at most 220 useful characters. This segmentation is carried out by the Arinc 618 layer of the transmitter. The first block $B_1$ is first of all encapsulated by the AoIP layer in an IP datagram, noted as $I(B_1)$ before being transmitted over the air interface. The datagram is received by a ground station and routed through the Internet network as far as the IP address of the addressee. The block $B_1$ is decapsulated from the datagram $I(B_1)$ by the AoIP layer and transmitted to the Arinc 618 layer. After checking its integrity, the Arinc 618 layer transmits an acknowledgment message $ack_1$ (or acknowledgment of receipt, both expressions being used indifferently) which is itself encapsulated in an IP datagram by the AoIP layer. The acknowledgment message is received by the aircraft, decapsulated by the AoIP layer and then transmitted to the Arinc 618 layer. This layer may then transmit the second block $B_2$. The process is repeated for each message block.

It is understood that the acknowledgment mechanism induced by the Arinc 618 layer is a severe penalty for the transmission rate of ACARS messages.

The object of the present invention accordingly is to propose a protocol for transmitting ACARS messages over IP which does not suffer from these throughput limitations, without however giving up the security of the transmission.

DISCUSSION OF THE INVENTION

The present invention is defined by a method for transmitting ACARS messages over IP, between a transmitter and a receiver, an ACARS message transmitted by an application being divided into a plurality of blocks, in which for each block of said message, except for the last, a dummy acknowledgment of receipt of said block is sent back locally at the transmitter, to said application and, when the transmitter receives from the receiver a message indicating proper reception of said plurality of transmitted blocks, it generates an acknowledgment of receipt of the last block before sending it back to said application.

Typically, said application comprises an Arinc 618 protocol layer, said ACARS message complies with this standard and the acknowledgment of receipt is transmitted to this layer.

According to a first embodiment, the transmitter comprises a protocol adaptation layer, referred to as first adaptation layer, between the Arinc 618 protocol layer and the IP layer, said first adaptation layer sending back for each block of an ACARS message, except for the last, a dummy acknowledgment to the Arinc 618 protocol layer, and when it has received from this layer the totality of the blocks of said message, it concatenates them and encapsulates the thereby concatenated blocks in a first IP datagram.

In a symmetric way, the receiver comprises a protocol adaptation layer, referred to as second adaptation layer between the Arinc 618 protocol layer of a second application and the IP layer, said second adaptation layer being adapted for decapsulating and segmenting the useful load of said IP datagram for recovering said blocks and then providing the blocks, one by one, to the Arinc 618 protocol layer of said second application, a block being provided to it only when it has acknowledged receipt of the previous block.

Preferably, when the second adaptation layer has received the totality of the acknowledgments of receipt of said blocks, it sends back to the transmitter in a second IP datagram, an acknowledgment of receipt of the plurality of said blocks.

According to a second embodiment, the transmitter comprises a protocol adaptation layer, referred to as third adaptation layer, between the Arinc 618 protocol layer and a TCP layer on IP, said third adaptation layer sending back for each block of an ACARS message, except for the last, a dummy acknowledgment to the Arinc 618 protocol layer, and when it has received from this layer the totality of the blocks of said message, it concatenates them and encapsulates the thereby concatenated blocks in a first TCP segment.

Advantageously, the receiver comprises a protocol adaptation layer, referred to as fourth adaptation layer, between the Arinc 618 protocol layer of a second application, and the TCP layer on IP, said fourth adaptation layer being adapted for decapsulating and segmenting the useful load of said first TCP segment for recovering said blocks, and then providing the blocks one by one, to the Arinc 618 protocol layer of the second application, a block being provided to it only when it has acknowledged receipt of the previous block.

Preferably, when the fourth adaptation layer has received the totality of the acknowledgments of receipt of said blocks, it sends back to the transmitter a second TCP segment containing an acknowledgment of receipt of the plurality of said blocks as well as an acknowledgment of the first TCP segment.

According to a third embodiment, the transmitter comprises a protocol adaptation layer, referred to as fifth adaptation layer, between the Arinc 618 protocol layer and a UDP layer on IP, said fifth adaptation layer sending back for each block of an ACARS message, except for the last, a dummy acknowledgment to the Arinc 618 protocol layer, and when it has received from this layer the totality of the blocks of said message, it concatenates them and encapsulates the thereby concatenated blocks in a first UDP datagram.

Advantageously, the receiver comprises a protocol adaptation layer, referred to as sixth adaptation layer, between the Arinc 618 protocol layer of a second application, and the UDP layer, said sixth adaptation layer being adapted for decapsulating and segmenting the useful load of said first UDP datagram for recovering said blocks, and then providing the blocks one by one, to the Arinc 618 protocol layer of the second application, a block being provided to it only when it has acknowledged receipt of the previous block and in that, when the sixth adaptation layer has received the totality of the acknowledgments of receipt of said blocks, it awaits the sending of a second ACARS message to the transmitter, the acknowledgment of receipt of the plurality of said blocks being then concatenated to the blocks of the second message before being placed in a second UDP datagram.

SHORT DESCRIPTION OF THE DRAWINGS

Figure 2:
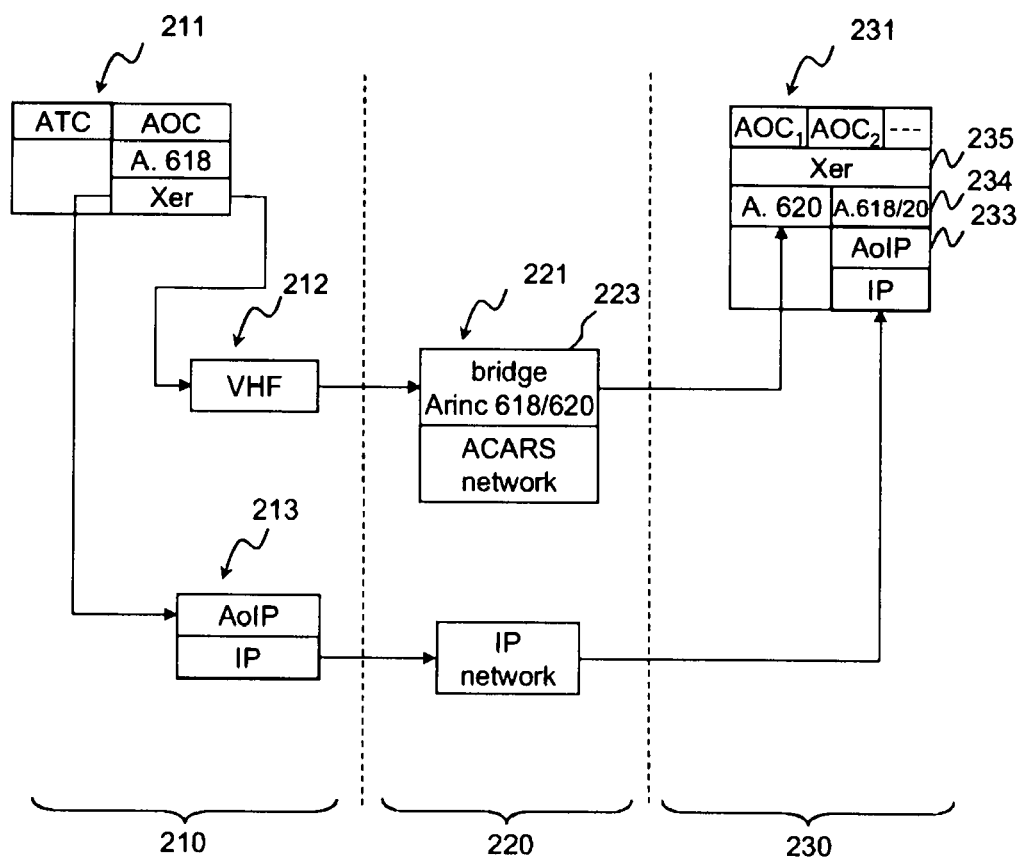
Figure 3:
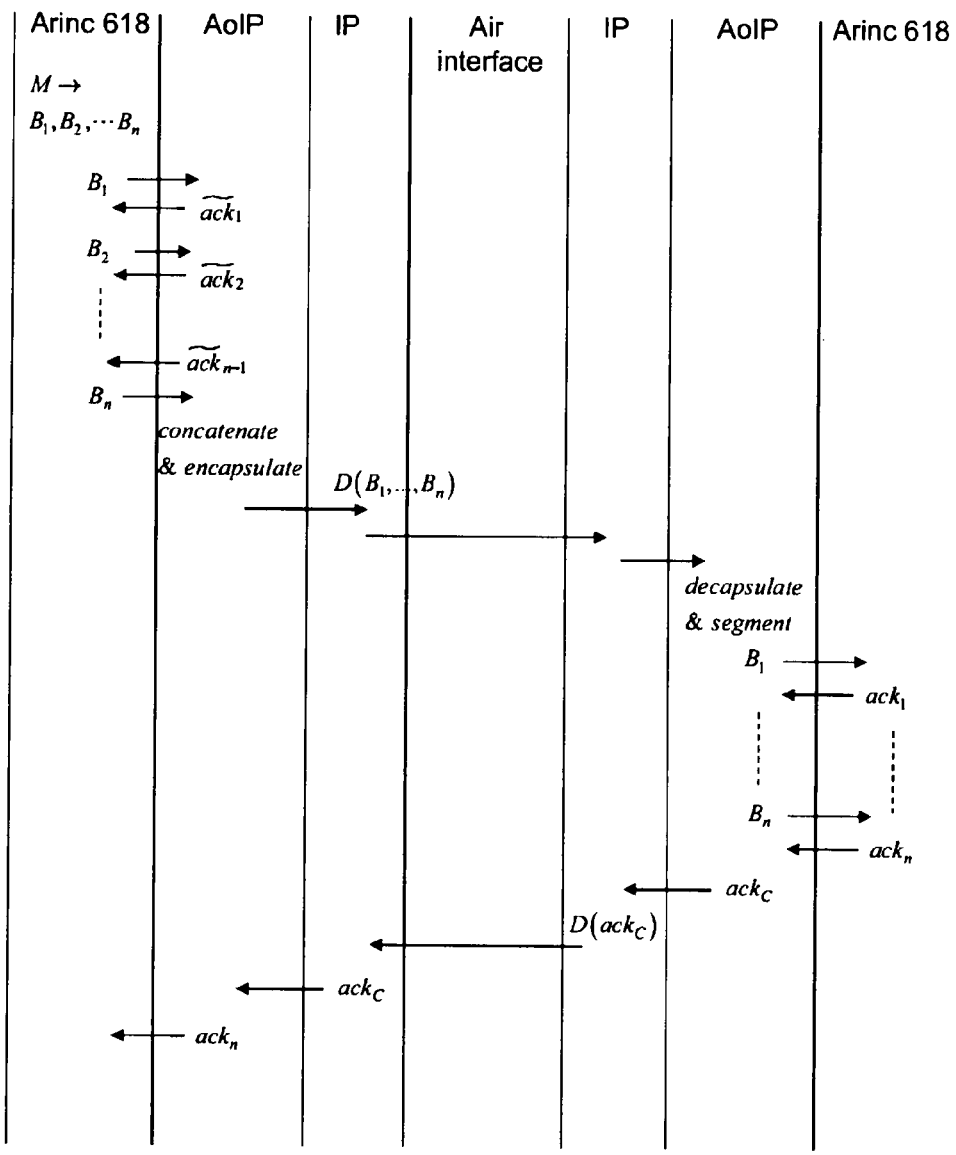
Figure 4A:
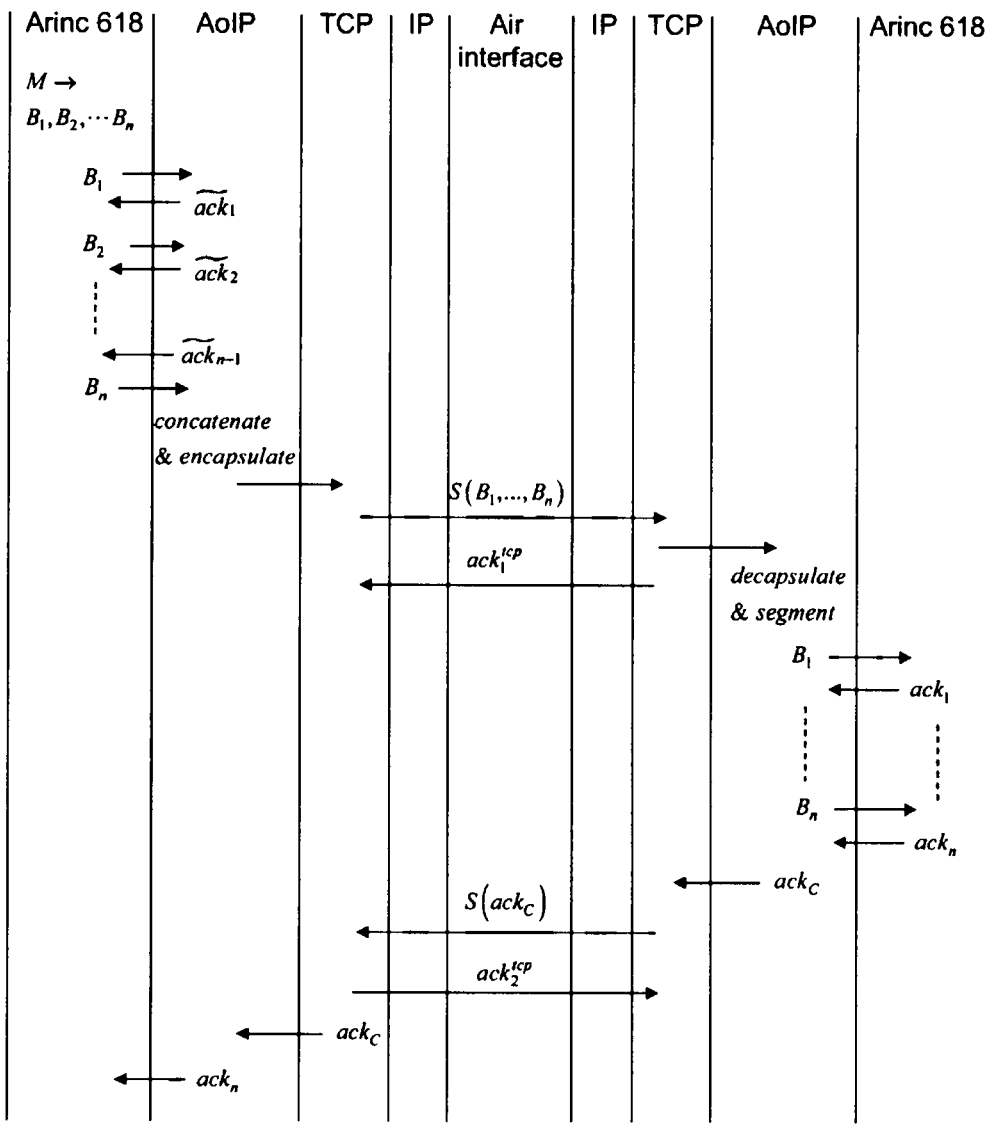
Figure 4B:
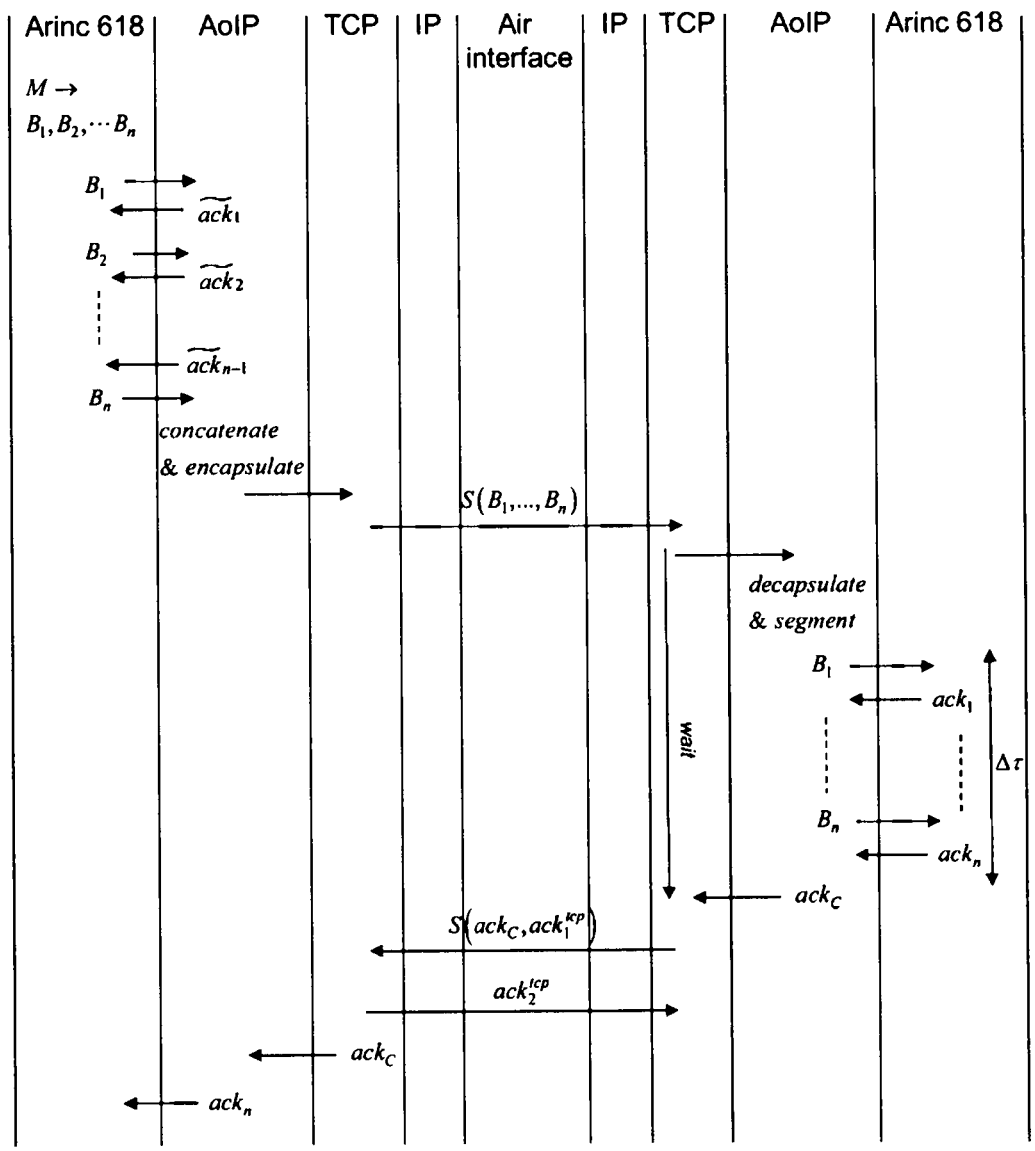
Figure 5:
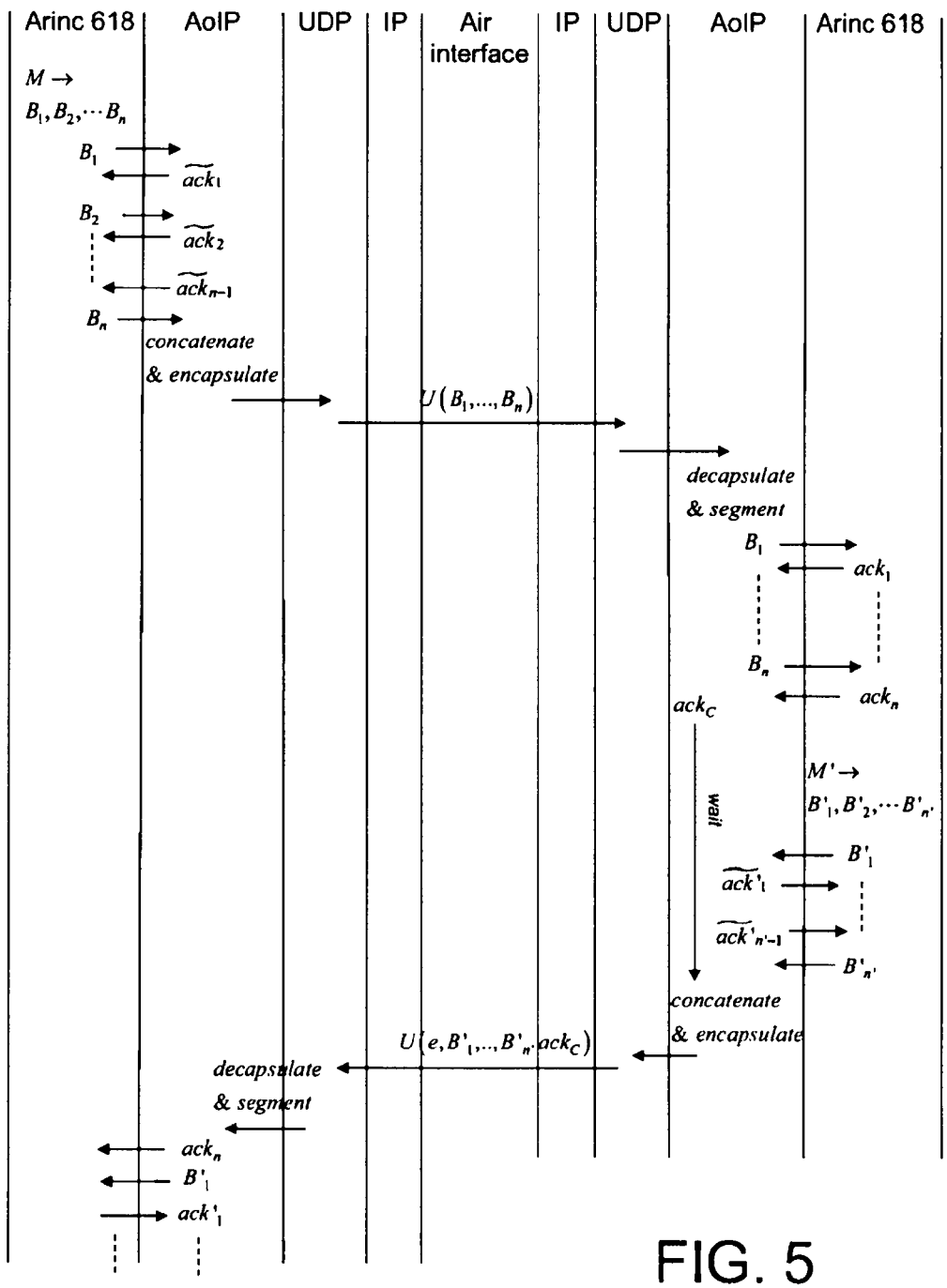

Other features and advantages of the invention will become apparent upon reading a preferential embodiment of the invention with reference to the appended figures wherein:

FIG. 1 schematically illustrates a protocol for transmitting ACARS messages over IP, known from the state of the art;

FIG. 2 illustrates a system for transmitting ACARS messages over IP capable of implementing the transmission method according to the invention;

FIG. 3 schematically illustrates a method for transmitting ACARS messages over IP according to an embodiment of the invention;

FIGS. 4A and 4B respectively illustrate a method for transmitting ACARS messages over IP according to a first and a second alternative embodiment of the invention;

FIG. 5 illustrates a method for transmitting ACARS messages over IP according to a third alternative embodiment of the invention.

DETAILED DISCUSSION OF PARTICULAR EMBODIMENTS

We shall again consider a system for transmitting/receiving ACARS messages over IP. In order to allow better understanding of the invention, an exemplary embodiment of such a system has been illustrated in FIG. 2. The man skilled in the art will however understand that this exemplary embodiment is only an indication and not a limitation, the invention being applicable to an AoIP message transmission system of any architecture.

The ACARS system over IP is divided into three segments: an on-board segment 210, a ground network segment 220, and a segment specific to the centre of the airline, 230.

The on-board segment comprises a CMU (Communications Management Unit) avionics module, 211, the structure of which is schematically illustrated in terms of protocol layers.

The CMU module harbours AOC and ATC applications respectively dedicated to exchanging data with the airline centre and with the air control centre. The data of AOC types are transmitted by means of ACARS messages via the Arinc 618 protocol layer. These messages may be sent either to a conventional transmission medium 212, for example a VHF, HF or SATCOM transmitter, or to a first conversion module 213, either included in the CMU or not. This conversion module uses a protocol adaptation layer noted as AoIP, between the Arinc 618 protocol layer of the application and the IP layer, as detailed later on.

When a conventional transmission medium is selected, the messages are transmitted to a ground station of the ACARS network. This station, 221, is equipped with a gateway 223, performing a conversion of the Arinc 618 protocol into an Arinc 620 protocol. It is recalled that the Arinc 620 standard is relative to a protocol for transmitting ACARS messages to the ground, for example between a service provider (DSP) and an operational airline centre If the transmission over IP is selected, the ACARS messages are sent to the gateway 213, the IP datagrams containing the ACARS messages are routed via the Internet network as far as the IP address of the addressee. The link between the aircraft and the ground is accomplished via a general public telecommunications infrastructure for example the GPRS network, a Wi-Fi terminal, a WiMax station.

The segment of the airline comprises a terminal 231, a terminal comprising an Arinc 620 protocol layer adapted for receiving ACARS messages passing in transit through the conversion gateway, i.e. via the conventional transmission medium on the one hand, and a protocol layer adapted for receiving ACARS messages having been in transit via the IP network on the other hand. More specifically, the terminal 231 comprises a second conversion module 233, belonging to the adaptation layer AoIP, responsible for decapsulating the blocks and transmitting them to the ACARS layer 618 and a ACARS 618/620 protocol adaptation layer, referenced at 234. A multiplexer, 235, directs the ACARS messages according to the Arinc 620 standard towards the ports of the control applications $AOC_1, \ldots, AOC_N$ harboured by the terminal 231.

The invention relates to the first and second conversion modules of the AoIP layer. The general principle is to load the whole of the blocks of a message in a single IP datagram to locally simulate artificially the acknowledgments of the blocks of an ACARS message except for the one of the last block which then applies as an acknowledgment of the whole of the blocks of the message.

More specifically, FIG. 3 illustrates a method for transmitting ACARS messages over IP, according to a first embodiment of the invention.

The Arinc 618 application layers, the AoIP adaptation layers, the IP layers for the on-board segment 310, and the ground segment 320 are again illustrated. The link between the on-board segment and the ground segment is achieved through an air interface and is advantageously based on a general public telecommunications infrastructure.

When an ACARS message M is to be transmitted by an application harboured by the transmitter, for example the CMU, this message is segmented into n blocks $B_1, \ldots, B_n$ by the Arinc 618 layer. It will be noted that the invention is not restricted to a given number of blocks, although $n \leq 16$ in the present state of the standard.

The first block $B_1$ is transmitted to the AoIP layer which then sends back a dummy acknowledgment $\widehat{ack}_1$, which allows the Arinc layer to transmit the second block $B_2$. The process is iterated until transmission of the last but one block $B_{n-1}$. When the Arinc 618 layer receives the dummy acknowledgment $\widehat{ack}_{n-1}$, it transmits the last block $B_n$. However, for the last block, no dummy acknowledgment is sent back. The n blocks of the message are then concatenated in order to form a composite block which is encapsulated in a single IP datagram, noted as $D(B_1, \ldots, B_n)$. This datagram is then routed as far as its IP destination address. It will be understood that the IP layer of the segment 320 corresponds to standard routing on the Internet.

At the IP destination address, i.e. in practice at the centre of the airline, the AoIP decapsulates the composite block of the IP diagram, before segmenting it, for recovering the blocks $B_1, \ldots, B_n$. The first block $B_1$ is then transmitted to the Arinc 618 application layer which then checks its integrity, and in the case of proper reception, sends an acknowledgment $ack_1$ back to the AoIP layer. The process is successively repeated for each block. The ACARS message M is reconstructed by the Arinc 618 layer of the addressee application (for example an application of the AOC type) from blocks $B_1, \ldots, B_n$.

When the AoIP layer receives the last acknowledgment $ack_n$, provided that it has nevertheless received beforehand the n−1 acknowledgments of the previous blocks, it transmits a composite acknowledgment message $ack_C$ meaning proper reception of the n blocks. The $ack_C$ message may simply result from the concatenation of the elementary acknowledgment messages $ack_1, \ldots, ack_n$. This message is then loaded in an IP datagram, $D(ack_C)$, before being routed towards the IP address of the CMU module of the aircraft.

The AoIP layer of the CMU recovers the acknowledgment message $ack_C$ and converts it into an acknowledgment message of the last block $ack_n$, before transmitting it to the Arinc 618 layer. The conversion of $ack_C$ into $ack_n$ may simply result from truncation of the composite message. When the Arinc 618 layer receives the last acknowledgment $ack_n$, it considers that the message M has actually been received by the addressee.

If one of the blocks $B_1, \ldots, B_n$ is corrupted or is not received by the addressee, the acknowledgment message $ack_C$ is not sent, and subsequently, the message $ack_n$ is not transmitted to the Arinc 618 layer. This layer may then decide after a predetermined waiting time, to send back the message M, i.e. the whole of the blocks $B_1, \ldots, B_n$.

In the foregoing, it was envisioned that the transmitter of the ACARS message was the CMU of the aircraft and the receiver the centre of the airline, in other words, the communication was a downward communication (downlink). It is however clear that the method applies equivalently to the upward communication (uplink) without however departing from the scope of the invention.

It will be understood that the ACARS message transmission method according to this embodiment is advantageous in that it is possible not to wait for actual acknowledgment of a block before sending the next one. Further, it will be noted that only one IP datagram is transmitted instead of n datagrams in order to transmit the message, which all the more reduces the traffic on the air interface and, possibly, the transmission costs.

The embodiment of the invention described earlier disregards the underlying transport protocol used, notably because it is connection-oriented, like TCP, or not connection-oriented, such as UDP.

We shall consider both situations successively hereafter.

FIG. 4A illustrates a first alternative where the ACARS message transmission method uses the standard TCP transport protocol. The TCP/IP protocol stack is detailed on the transmitter side and on the receiver side. It is known that the TCP layer establishes and maintains a connection between the transmitter and the addressee and that it uses its own acknowledgment mechanism for guaranteeing proper reception of the TCP datagrams.

This alternative does not require any modification of the TCP transport layer and therefore the layer noted as AoIP actually achieves an adaptation of the Arinc 618 application layer to the TCP transport layer. More specifically, the blocks $B_1, \ldots, B_n$ delivered by the Arinc 618 layer, according to the already described dummy acknowledgment mechanism, are concatenated and encapsulated in a TCP segment. Once the TCP connection is established, the TCP segment noted as $S(B_1, \ldots, B_n)$ is transmitted to the TCP socket of the addressee. Of course, transmission of the TCP segment involves incorporation into an IP datagram in a way known to the man skilled in the art.

When the TCP segment is received by the TCP socket of the addressee, an acknowledgment of receipt $ack_1^{tcp}$ is sent back to the transmitter as provided by the TCP protocol. Delivery of the blocks of the AoIP layer to the Arinc 618 layer has already been described in connection with FIG. 2 and will not be repeated here.

When the AoIP layer has received the acknowledgments of receipt, $ack_1$ to $ack_n$ from the Arinc 618 layer, it transmits a composite acknowledgment of receipt $ack_C$ to the TCP layer, which itself transmits it as a TCP segment noted as $S(ack_C)$, to the TCP socket of the transmitter. Upon receiving the segment $S(ack_C)$ by the TCP layer of the CMU, an acknowledgment of receipt noted as $ack_2^{tcp}$ is then sent back to the ground, according to the TCP protocol. The acknowledgment of receipt is then converted into a message for acknowledging the last block, $ack_n$, as already described.

This alternative allows direct implementation of the embodiment of FIG. 3 on an existing TCP/IP protocol stack.

However, it will be noted that it requires the transmission of four other TCP segments on the air interface, i.e. $S(B_1, \ldots, B_n)$, $ack_1^{tcp}$, $S(ack_C)$ and $ack_2^{tcp}$.

FIG. 4B illustrates a second alternative of the embodiment described earlier. This second alternative allows a reduction in the number of TCP segments in transit through the air interface.

More specifically, the second alternative differs from the first in that the acknowledgment $ack_1^{tcp}$ is not transmitted independently. This second alternative may be achieved by delaying the transmission of the acknowledgment of receipt of $S(B_1, \ldots, B_n)$ until the TCP layer has itself received the composite acknowledgment $ack_C$ from the AoIP layer, or else, by making sure that the time $\Delta r$ for processing the blocks $B_1, \ldots, B_n$ by the Arinc 618 layer, in the worst case when n=16, is shorter than the time required for generating the acknowledgment of receipt. The processing time $\Delta r$ may be reduced by suitable selection of the processor, by a more efficient compression algorithm (therefore reducing the number and size of the blocks), or further a faster error checking algorithm.

In any case, the composite acknowledgment $ack_C$ is transmitted with the acknowledgment of receipt of $S(B_1, \ldots, B_n)$ in a single TCP segment, noted as $S(ack_C, ack_1^{tcp})$. Upon receiving this segment by the corresponding TCP port of the CMU, an acknowledgment $ack_2^{tcp}$ is sent back to the ground. The remainder of the acknowledgment process is identical with that of the first alternative. Eventually, only three TCP segments are in transit on the interface for a transmitted ACARS message, i.e. $S(B_1, \ldots, B_n)$, $S(ack_C, ack_1^{tcp})$ and $ack_2^{tcp}$.

FIG. 5 illustrates a third embodiment wherein the ACARS message transmission method uses a transport protocol which does not have any specific acknowledgment mechanism, for example the UDP protocol. It is known that the UDP protocol is not a connection-oriented protocol guaranteeing proper forwarding of the datagrams.

The idea at the basis of this alternative is to await transmission of an ACARS message over the upward route in order to send back the acknowledgment of receipt of the message which has just been received over the downward route. In a symmetrical way, transmission of a message over the downward route will be awaited in order to send back the acknowledgment of receipt of the message which has just been received over the upward route. The case of a transmission of an ACARS message M on the downward route has been illustrated in FIG. 5.

The transmission of the message M is performed as already described in FIG. 4, the transport layer having been simply detailed here. In other words, the blocks $B_1, \ldots, B_n$ are transmitted to the AoIP layer which concatenates them and encapsulates them in a UDP datagram. The UDP datagram, noted as $U(B_1, \ldots, B_n)$ is then incorporated in a standard way into an IP datagram. Upon its receiving by the addressee, the datagram $U(B_1, \ldots, B_n)$ is extracted from the IP datagram and the blocks $B_1, \ldots, B_n$ are successively delivered by the UDP layer to the Arinc 618 layer. The acknowledgments of receipt $ack_1, \ldots, ack_n$ received by the AoIP layer are converted by this layer into a composite acknowledgment of receipt $ack_C$ which is kept pending.

When the earth-borne airline centre transmits an ACARS message M' over the upward route, for example as a reply to the message M, the acknowledgment of receipt $ack_C$ is loaded with the blocks of the message M' into the UDP datagram. More specifically, the message M' is divided into blocks $B'_1, \ldots, B'_{n'}$ with $n' \leq 16$ by the Arinc 618 layer. The block $B'_1$ is transmitted to the AoIP layer which sends back to it a dummy acknowledgment $\hat{ack}'_1$. The process is repeated for the following blocks except for the last for which the dummy acknowledgment is not transmitted, as this has already been seen for the downlink. When the AoIP layer is in possession of blocks $B'_1, \ldots, B'_{n'}$, it checks whether an acknowledgment of receipt is pending. If this is the case, the acknowledgment of receipt is loaded with the blocks $B'_1, \ldots, B'_{n'}$ in the same UDP datagram, the loading of an acknowledgment of receipt being possibly signalled in the datagram by a characteristic header.

Advantageously, a timer is loaded with a time-out period $\tau_{max}$ when the n blocks $B_1, \ldots, B_n$ have been received by the AoIP layer. If a message M' is to be transmitted by the AoIP layer during the time-out period $\tau_{max}$, the acknowledgment of receipt $ack_C$ is loaded with the blocks of the message M' as described earlier. On the other hand, if at the end of the time-out period, there is still no message M' to be transmitted over the upward route, the acknowledgment of receipt is then sent by means of a separate UDP datagram. The time-out period may be adaptive and notably depend on the filling rate of the ACARS message transmission buffer on the downward route. Thus, for a high filling rate, the duration $\tau_{max}$ will be selected to be relatively short so as not to delay the sending of a new message by Arinc 618 layer.

In the case illustrated in FIG. 5, the single composite acknowledgment of receipt $ack_C$ is concatenated with the blocks $B'_1, \ldots, B'_n$ in order to be transmitted as a datagram noted as $U(e, B'_1, \ldots, B_n)$, wherein e is the aforementioned header. This UDP datagram is then of course incorporated into an IP datagram which is routed towards the CMU of the aircraft. At destination, the datagram $U(e, B'_1, \ldots, B'_{n'}, ack_C)$ is extracted from the IP datagram. The AoIP layer then recognizes the presence of an acknowledgment of receipt by the presence of the header e. It extracts and segments the blocks $B'_1, \ldots, B'_{n'}$, as well as the acknowledgment $ack_C$, before delivering them to the Arinc 618 layer. The header e may also indicate the filling rate of the ACARS message buffer on the upward route. In a symmetrical way relatively to the downward route, a timer will be loaded as soon as the blocks $B'_1, \ldots, B'_{n'}$ are received, with a time-out period $\tau'_{max}$. This period will depend on the filling rate indicated in the header. As earlier, it defines the maximum waiting time for acknowledging receipt of the message M', the acknowledgment of receipt $ack'_C$ may be transmitted by an UDP datagram $U(e', B_1, \ldots, B_n, ack'_C)$ picking up a new message on the downward route or, by default, by a separate UDP datagram, at the end of the time-out period. The datagram $U(e', B'_1, \ldots, B'_n, ack'_C)$ advantageously comprises a header indicating the state of the transmission buffer on the downward route.

Eventually, for a transmitted ACARS message, a single datagram passes in transit, as a general rule, over the air interface, i.e. $U(e', B_1, \ldots, B_n, ack'_C)$ for the message on the downward route and $U(e, B'_1, \ldots, B'_n, ack_C)$ for the message on the upward route.

The invention claimed is:

1. A method for transmitting ACARS messages over IP, between a transmitter and a receiver, the method comprising:
    dividing an ACARS message transmitted by an application into a plurality of blocks;
    for each block of said message, except for the last block, locally, at the transmitter, sending a dummy acknowledgment of receipt of said block back to said application; and
    when the transmitter receives from the receiver a message indicating proper reception of said plurality of transmitted blocks, generating, at the transmitter, an acknowledgment of receipt of the last block before sending the acknowledgment of receipt back to said application.

2. The transmission method according to claim 1, wherein said application comprises an Arinc 618 protocol layer, said ACARS message complies with Arinc 618 protocol, and the acknowledgment of receipt is transmitted to the Arinc 618 protocol layer.

3. The transmission method according to claim 2, wherein the transmitter comprises a protocol adaptation layer, referred to as a first adaptation layer, between the Arinc 618 protocol layer and an IP layer, said first adaptation layer sending back for each block of the ACARS message, except for the last, the dummy acknowledgment of receipt to the Arinc 618 protocol layer, and when the Arinc 618 protocol layer has received from the first adaptation layer the totality of blocks of said message, the Arinc 618 protocol layer concatenates the blocks and encapsulates the thereby concatenated blocks in a first IP datagram.

4. The transmission method according to claim 3, wherein the receiver comprises a protocol adaptation layer, referred to as a second adaptation layer, between an Arinc 618 protocol layer of a second application and the IP layer, said second adaptation layer being adapted for decapsulating and segmenting a useful load of said IP datagram in order to recover said blocks, and then providing the blocks, one by one, to the Arinc 618 protocol layer of said second application, a block being provided to the Arinc 618 protocol layer of the second application only when the Arinc 618 protocol layer of the second application has acknowledged receipt of a previous block.

5. The transmission method according to claim 4, wherein, when the second adaptation layer has received the totality of the acknowledgments of receipt of said blocks, the second adaptation layer sends back to the transmitter in a second IP datagram an acknowledgment of receipt of the plurality of said blocks.

6. The transmission method according to claim 2, wherein the transmitter comprises a protocol adaptation layer, referred to as a third adaptation layer, between the Arinc 618 protocol layer and a TCP layer over IP, said third adaptation layer sending back for each block of the ACARS message, except for the last, the dummy acknowledgment of receipt to the Arinc 618 protocol layer, and when the Arinc 618 protocol layer has received from the third adaptation layer the totality of the blocks of said message, the Arinc 618 protocol layer concatenates the blocks and encapsulates the thereby concatenated blocks in a first TCP segment.

7. The transmission method according to claim 6, wherein the receiver comprises a protocol adaptation layer, referred to as a fourth adaptation layer, between the Arinc 618 protocol layer of a second application and the TCP layer, said fourth adaptation layer being adapted for decapsulating and segmenting a useful load of said first TCP segment in order to recover said blocks, and then providing the blocks one by one to the Arinc 618 protocol layer of the second application, a block being provided to the Arinc 618 protocol layer only when the Arinc 618 protocol layer has acknowledged receipt of a previous block.

8. The transmission method according to claim 7, wherein, when the fourth adaptation layer has received the totality of the acknowledgments of receipt of said blocks, the fourth adaptation layer sends back to the transmitter a second TCP segment containing an acknowledgment of receipt of the plurality of said blocks as well as acknowledgment of the first TCP segment.

9. The transmission method according to claim 2, wherein the transmitter comprises a protocol adaptation layer, referred to as a fifth adaptation layer, between the Arinc 618 protocol layer and a UDP layer over IP, said fifth adaptation layer sending back for each block of an ACARS message, except for the last, a dummy acknowledgment of receipt to the Arinc 618 protocol layer, and when the Arinc 618 protocol layer has received from the fifth adaptation layer the totality of the blocks of said message, the Arinc 618 protocol layer concatenates the blocks and encapsulates the thereby concatenated blocks in a first UDP datagram.

10. The transmission method according to claim 9, wherein the receiver comprises a protocol adaptation layer, referred to as a sixth adaptation layer, between the Arinc 618 protocol layer of a second application and the UDP layer, said sixth adaptation layer being adapted for decapsulating and segmenting a payload of said first UDP datagram in order to recover said blocks, and then providing the blocks, one by one, to the Arinc 618 protocol layer of the second application, a block being provided to the Arinc 618 protocol layer only when the Arinc 618 protocol layer has acknowledged receipt of a previous block and, when the sixth adaptation layer has received the totality of the acknowledgments of receipt of said blocks, the sixth adaptation layer awaits the sending of a second ACARS message to the transmitter, the acknowledgment of receipt of the plurality of said blocks being then concatenated to the blocks of the second message before being placed in a second UDP datagram.

* * * * *